United States Patent [19]

Napierkowski et al.

[11] Patent Number: 5,431,521
[45] Date of Patent: Jul. 11, 1995

[54] INDIRECT LOCK AND LOCK RELEASE MECHANISM

[75] Inventors: Susan M. Napierkowski; Arthur T. Nagare, both of Erie; Richard J. Verga, Cranesville, all of Pa.

[73] Assignee: American Sterilizer Company, Erie, Pa.

[21] Appl. No.: 868,911

[22] Filed: Apr. 15, 1992

[51] Int. Cl.[6] ............................................. B60P 1/64
[52] U.S. Cl. ..................................... 414/401; 410/66; 410/67; 410/69; 414/584; 414/537; 414/396; 414/498; 414/400; 188/62; 188/63; 104/251; 14/71.3
[58] Field of Search ....................... 188/33, 34, 35, 36, 188/38, 38.5, 41, 61, 62, 63; 104/249, 259, 251, 260, 254, 255, 100, 103, 257, 252; 49/70; 414/390, 315, 386, 400, 401, 331, 402, 584, 537, 538, 154; 432/239, 241, 250; 14/69.5, 71.1, 71.3, 71.5, 72.5; 422/219, 232, 286, 300; 238/218; 410/30, 69, 66, 67

[56] References Cited

U.S. PATENT DOCUMENTS

| | | | |
|---|---|---|---|
| 745,069 | 11/1903 | McClure | 188/63 |
| 2,623,759 | 12/1952 | Forbas | 410/30 |
| 3,021,795 | 2/1962 | Hayba et al. | 104/251 X |
| 3,261,650 | 7/1966 | Stromqvist | 414/401 X |
| 3,630,439 | 12/1971 | Cook | 246/433 X |
| 3,869,052 | 3/1975 | Leahy | 414/498 X |
| 4,388,030 | 6/1983 | Skaale | 410/69 |
| 4,480,723 | 11/1984 | Ingvast et al. | 104/257 X |
| 4,739,863 | 4/1988 | Stauffer | 188/62 X |
| 5,004,387 | 4/1991 | Jensen et al. | 410/94 X |
| 5,224,812 | 7/1993 | Oslin et al. | 414/401 X |

OTHER PUBLICATIONS

AMSCO–Small Stream Sterilization System, Mar. 1978, pp. 1, 4–8.
AMSCO–Large Steam Sterilization System, Oct. 1977, pp. 1, 4, 6.
AMSCO–Eagle Ito Gas Sterilization System, Feb. 1983, pp. 1, 11.

Primary Examiner—Frank E. Werner
Attorney, Agent, or Firm—Jones, Day, Reavis & Pogue

[57] ABSTRACT

An indirect locking and lock release mechanism is provided that permits remote actuation of the lock release function and automatic reset of the locking function in a chamber. Components on a transfer carrier permit remote actuation of locking components in a chamber through intermediate components on a ramp between the chamber and the transfer carrier. Members are provided to secure the transfer carrier to the ramp. Linear actuation of a push rod at the remote end of the transfer carrier causes linear actuation of a linearly aligned push rod on the ramp which in turn causes pivotal movement of a blocking member from a locked to an unlocked position in the chamber. Fail safe mechanisms are provided to prevent movement of the blocking member to the unlocked position when the transfer carrier is not secured to the ramp.

22 Claims, 9 Drawing Sheets

INDIRECT LOCK AND LOCK RELEASE MECHANISM

BACKGROUND OF THE INVENTION

1. Field of the Invention

The present invention relates to locking and unlocking mechanisms and more particularly, to remotely actuated lock release mechanisms.

2. Description of the Invention Background

In certain types of sterilizers and washers, a loading car carrying items to be sterilized or cleaned can be rolled directly into the chamber of the sterilizer/washer on tracks designed specifically to guide the loading car. Loading cars of this type are typically mounted on a transfer carriage which has wheels and can be pushed from place to place to bring the items to be sterilized or cleaned, including the loading car, to the sterilizer/washer and to return the loading car full of clean or sterilized items to a desired destination.

Often, however, it is difficult to safely transfer the loading car between the transfer carriage and the chamber of the sterilizer/washer. Many sterilizer/washers have a gap of from several inches to a foot between the chamber opening and the front panel of the sterilizer/washer. The transfer carriage cannot be pushed beyond the lower front panel. To permit the loading car to traverse the gap between the lower front panel and the chamber opening, conventional transfer carriages have extended track sections which meet the track within the sterilizer/washer chamber so that the loading car can roll along the track extensions into or out of the chamber. The operator pushes the loading car into the chamber or pulls it out of the chamber over the extended tracks. The full weight of the loading car full of goods is borne by the extended tracks. There is a danger that the weight of the loading car will tip the extended tracks and the transfer carriage and thereby cause the transfer carriage to tip or roll back. The loading car can then crash to the ground.

Another problem is in the poor alignment that sometimes occurs between the extended tracks of the transfer carriage and the chamber tracks. If the tracks of the transfer carriage are not properly aligned with the tracks of the chamber, the loading car will not ride smoothly into the chamber, but will run into the side of the track or end frame of the chamber when the operator pushes the car forward. Often, the operator cannot see clearly whether the tracks are aligned when pushing the car from behind.

When unloading a loading car onto the transfer carriage, the operator must pull the loading car from the hot sterilizer/washer. Some systems do not have the loading cars locked into place. If these tracks are slightly tilted because the sterilizer is not level, the loading car can roll out of the chamber when the door is opened. If the loading car is somehow restrained in the chamber, the operator must reach into the hot chamber to release the loading car before removing it from the sterilizer/washer, then pull the car out over the track extensions onto the transfer carriage. Furthermore, the transfer carriage itself is on wheels and thus, can roll away from the sterilizer/washer while the operator is pulling or pushing the loading car.

There is a need for a mechanism to secure the transfer carriage in position relative to the sterilizer/washer for safe transfer of the loading car into and out of the chamber. There is a further need to lock the loading car into the chamber and to remotely unlock the loading car to eliminate the need for operators to reach into hot sterilizer/washers to release the car. Finally, there is a need for a fail safe mechanism to prevent release of the loading car until the transfer carriage is securely positioned relative to the sterilizer/washer.

SUMMARY OF THE INVENTION

The object of the present invention is to provide a safe and easy to use mechanism for loading and unloading the load cars from the chamber of a sterilizer/washer. Other uses for the lock and unlock mechanism of the present invention will become apparent to those skilled in the art as they read the following description of the invention.

The present invention provides an apparatus for remotely permitting or prohibiting the travel of a movable device, such as a loading car. The apparatus includes a blocking member mounted for movement between a first position for blocking a path of travel of the movable device and a second nonblocking position for permitting the travel of the movable device when it is on the path, an actuating member having a first end proximate the blocking member and a second end remotely situated from the blocking member, means to bias the actuating member away from operative contact with the blocking member, and means remotely situated from the blocking member for cooperating with the second end of the actuating member for moving the first end of the actuating member into operative contact with the blocking member effective for moving the blocking member from the first position to the second position or from the second position to the first position as desired.

The apparatus also includes means for locking the actuating member into operative contact with the blocking member to maintain the blocking member in the desired position. Means for releasing the locking means to permit the actuating member to move out of operative contact with the blocking member are also provided.

The cooperating means is preferably mounted on a movable carrier, such as a transfer carriage, and the blocking member is mounted on a stationary surface, such as the floor of a chamber or other compartment. The actuating member is intermediate the blocking member and the cooperating means so that operation of the remotely situated cooperating means causes the actuating member to move the blocking member to the desired position. The apparatus of the present invention also preferably includes means for securing the movable carrier to the stationary surface, and means for preventing the cooperating means from cooperating with the actuating member unless the movable carrier is secured to the stationary surface. Means for releasing the securing means may also be provided.

The blocking member of the present invention can be unlocked by an operator standing behind the movable carrier without having to touch any hot parts. The blocking member will automatically stay in the second, unlocked position, once the cooperating means actuates the actuating member. An automatic reset is provided to return the cooperating means and the actuating member to their unactuated positions when the securing means for securing the movable carrier to the stationary surface are released.

BRIEF DESCRIPTION OF THE DRAWINGS

The present invention can be better understood by reference to the drawings, which are illustrative only, of the preferred embodiment of the invention.

FIG. 17 is a top view of the fail safe mechanism in the locked position.

DETAILED DESCRIPTION OF THE PREFERRED EMBODIMENTS

Figure 1:
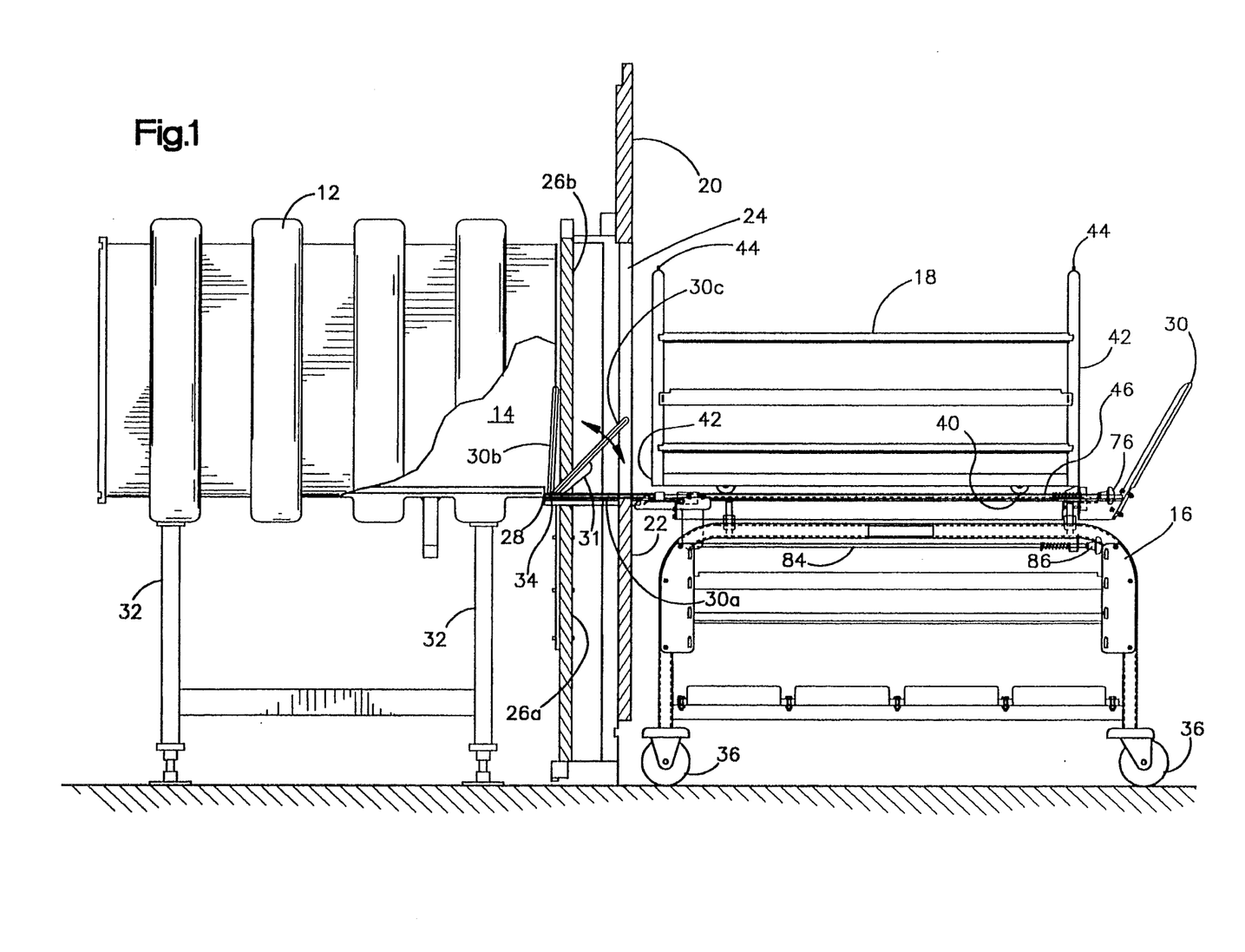
FIG. 1 illustrates a side, partially cut away view of a chamber, movable transfer carriage and loading car.

FIGS. 1–17 illustrate various component parts of the indirect lock and lock release mechanism of the present invention. FIG. 1 shows generally a chamber housing 12 defining a chamber 14, a transfer carriage 16 and a loading car 18. The chamber housing 12 can be a sterilizer, a washer or any compartment wherein a car or other movable device can be temporarily housed, preferably in a locked position on a track, guide system or the like. Those skilled in the art will recognize that the lock and lock release mechanism of the present inventor has a variety of applications in the health care, food service, transportation and other industries. The mechanism of the present invention was specifically designed for use with front loading sterilizers having vertically sliding doors and will be described in detail herein with reference to that preferred application.

Figure 2:
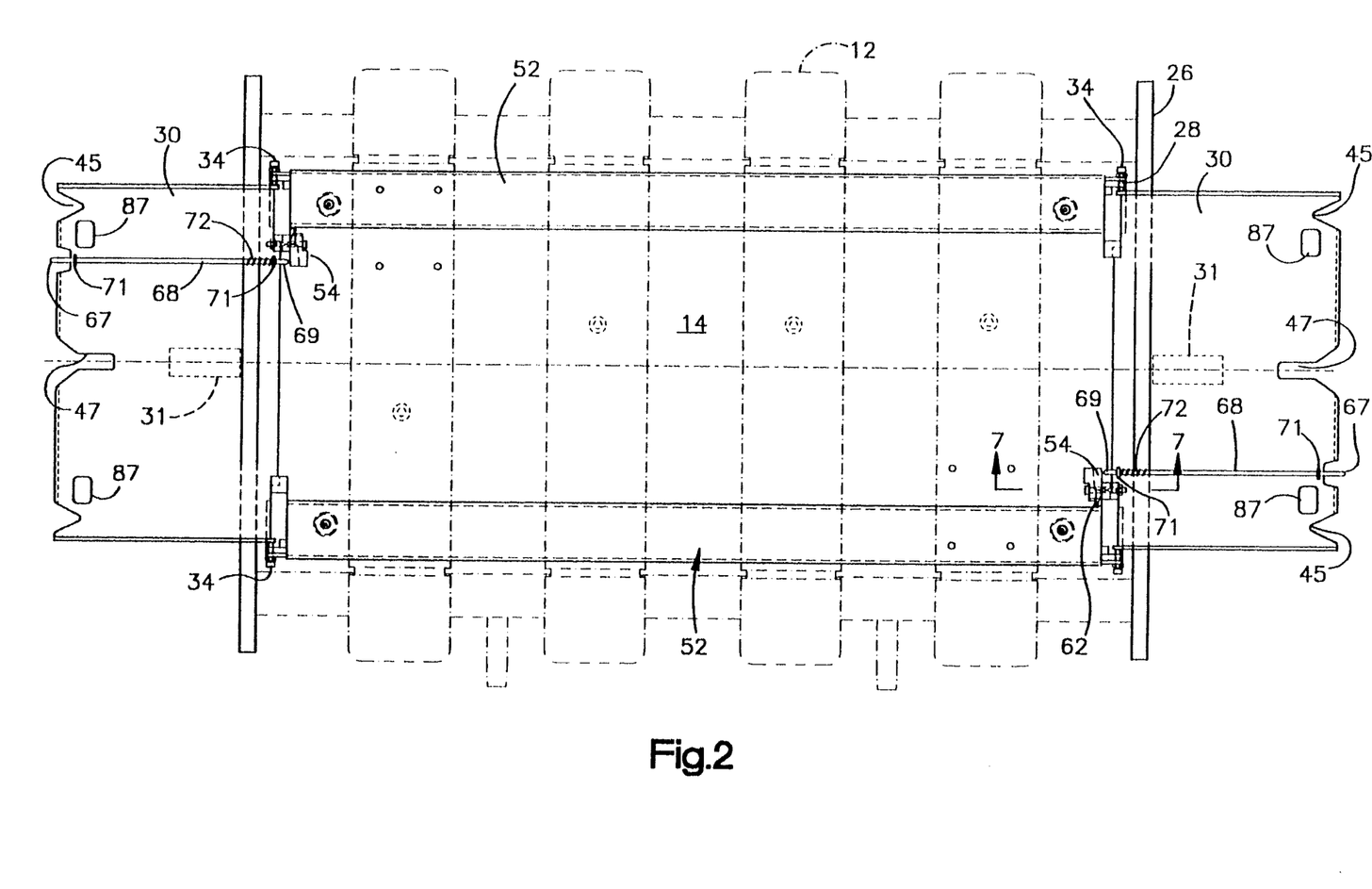
FIG. 2 illustrates a top plan view of the interior floor of a chamber which is accessible at both ends and which shows the track lock mechanism.
Figure 3:
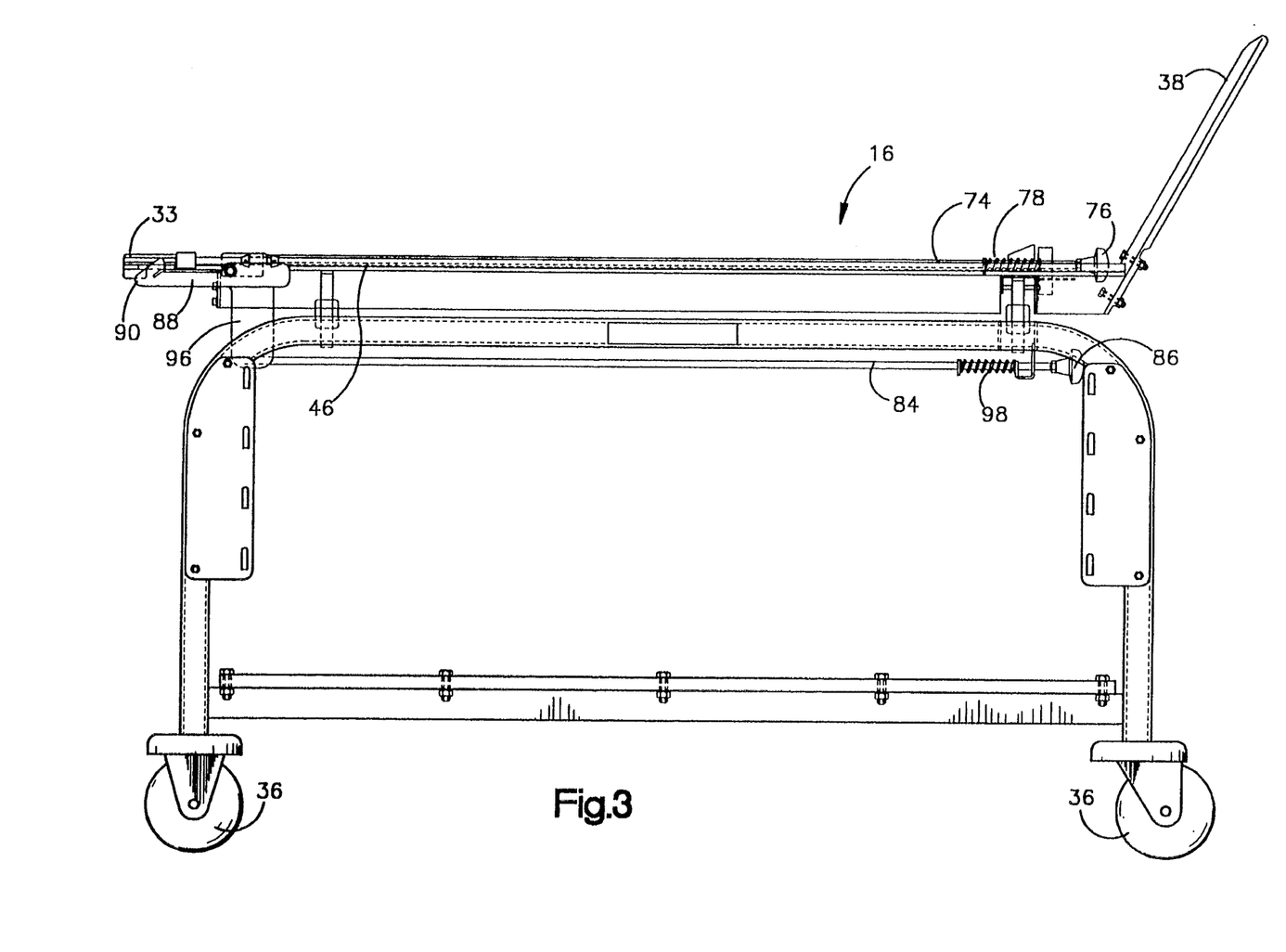
FIG. 3 is a side view of a transfer carriage showing a portion of the remote track lock release mechanism.

The chamber housing 12 is positioned on legs 32 behind a front panel or wall having an upper panel 20 and a lower panel 22. FIG. 1 illustrates door 26 in both the open (26a) and the closed (26b) positions. The chamber door 26 slides vertically to open and close the opening of the chamber. The floor of the chamber 14 provides a stationary surface on which the loading car 18 is kept during processing. Referring to FIG. 2, the floor of chamber 14 includes a pair of tracks 52 for guiding the wheels 40 of the loading car 18 as it travels in and out of the chamber. A block at the end of the chamber tracks 52 is designated as 28 in FIG. 1.

As shown in FIG. 1, there is a gap between the opening 24 in the front panel and the track end 28 on the floor of the chamber 14. To bridge the gap, a ramp 30 is shown in three of its possible positions, fully raised (30b), fully lowered (30a) and in between (30c). The ramp 30 preferably moves from the fully raised position to the fully lowered position and vice versa with the opening and closing, respectively, of the door 26. Ramp 30 is pivotally mounted by a pivot pin 34 to the track end block 28 in the chamber 14. The ramp fully raised position is adjusted by means of a screw 63 and nut 61. Ramp 30 has two notches 87 spaced a distance d from each other, V-shaped recesses 45 and a guide slot 47. Ramp 30 and its operation are described more fully in the co-pending U.S. patent application of Susan M. Napierkowski and Arthur T. Nagare for Sterilizer Loading Car Transfer Apparatus, filed simultaneously herewith, the relevant details of which are incorporated herein by reference. While the ramp 30 is used in the preferred embodiment, any suitable bridge between the transfer carriage 16 and the chamber 14 that can be used to support the loading car 18 during transfer and which can be secured to the transfer carriage 16 will suffice. In other applications where there is no gap between the opening of the compartment and the movable carrier, a bridge or ramp between the two will not be necessary. The movable carrier can be secured directly to the stationary surface of the compartment.

Figure 4:
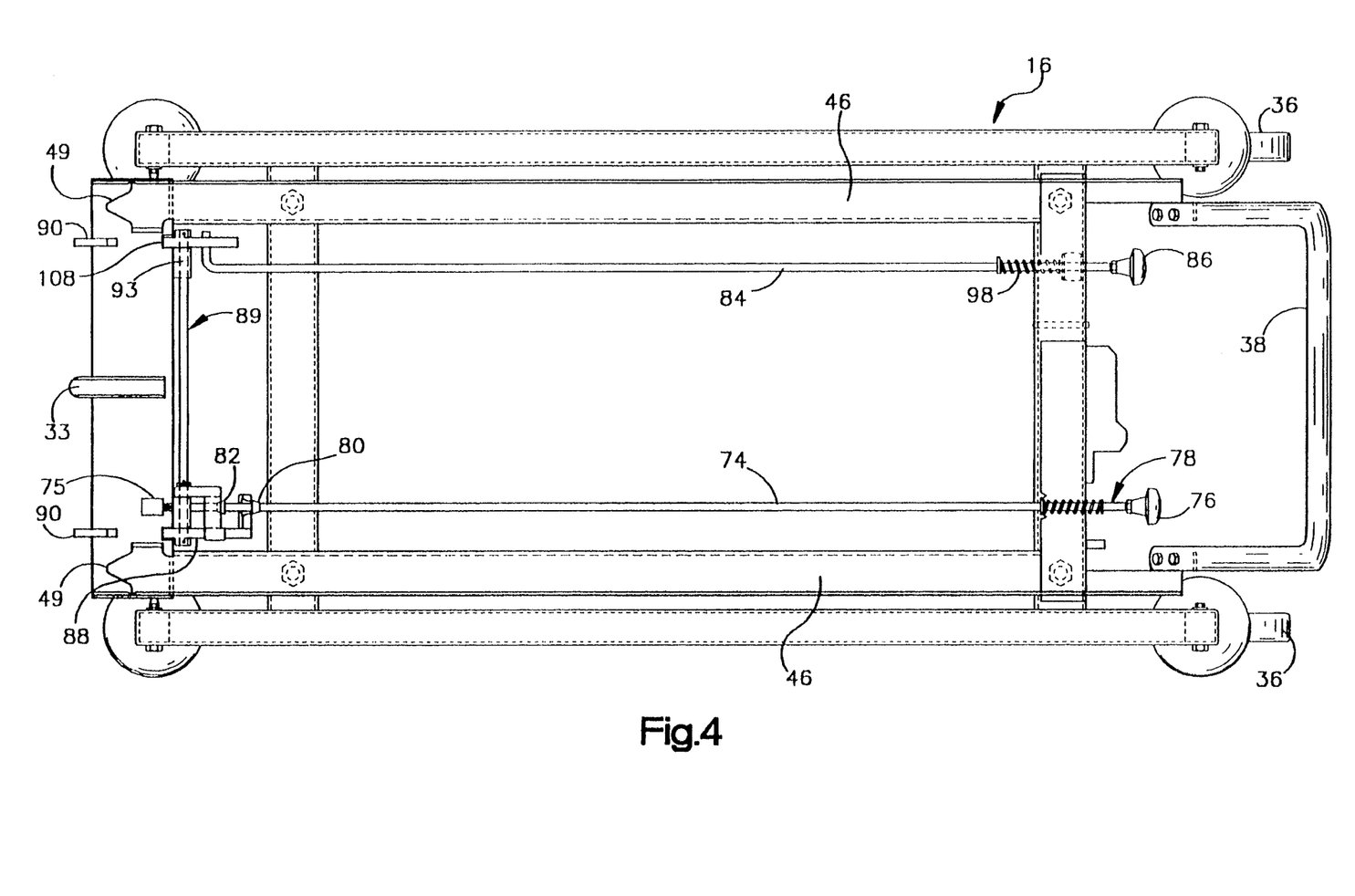
FIG. 4 is a top view of the transfer carriage of FIG. 3.

The transfer carriage 16 is an example of a movable carrier for transporting movable devices such as the loading car 18. Suitable known means are provided to lock the loading car 18 to the transfer carriage 16 during transport until the loading car is to be rolled into the chamber 14. The transfer carriage 16 includes an alignment bar 33 having a rounded end to be received in the guide slot 47 of ramp 30, wheels 36, suitable shelving, a pair of tracks 46 with V-shaped tips 49 and a push handle 38. Referring to FIG. 4, the transfer carriage 16 also includes a track lock release push rod 74 and knob 76 and a latch hook release rod 84 and knob 86, springs 78 and 98 are provided on each rod 74, 84, respectively. Two latch hook members 88, 108 are pivotally mounted on opposing sides of the transfer carrier 16 and spaced a distance d from each other for engagement with complementary notches 87 in ramp 30. A cross rod 89 connects the hook members 88, 108 so that they can be moved in unison.

The loading car 18 includes two opposing ends 42, shelving for holding items to be sterilized or cleaned and wheels 40 which ride within the tracks 46 of the transfer carriage 16. The wheels preferably include ball bearings to make the loading car 18 easy to manipulate. The easier manipulation of the car 18 can create problems if the chamber surface is not entirely level. The car 18 can roll out when the door 26 is opened (26a). To prevent the unintended-travel of the car 18, the lock mechanism of the present invention is required. As shown more clearly in FIG. 5, the ends 42 of loading car 18 include squared bottom edges 48 for locking cooperation with the track lock of the present invention, as described more fully below. The top edge of each end 42 of the loading car 18 includes a sight 44, similar to a gun sight, to aid alignment of the transfer carriage 16 by lining the sights 44 with a corresponding triangular shaped marker (not shown) on the center edge of the front panel 20.

Figure 8:
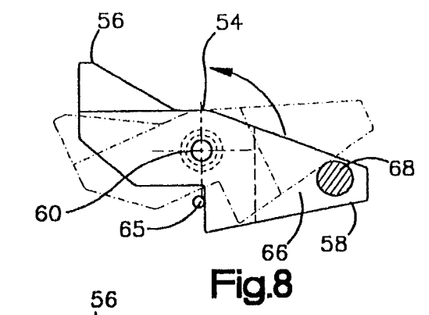
FIG. 8 is a front view of the track lock, showing rotational movement.
Figure 9:
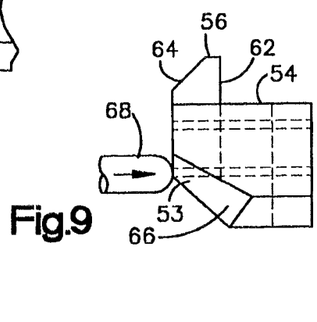
FIG. 9 is a side elevation view of the track lock.

The track lock mechanism of the present invention is shown more fully in FIGS. 6–9. The track lock mechanism includes a specially shaped blocking member 54 pivotally mounted to a mounting member 70 by shoulder bolt 60. Referring to FIG. 8, the blocking member 54 includes an upwardly extending stop portion 56 and a downwardly extending weighted portion 58.

Figure 5:
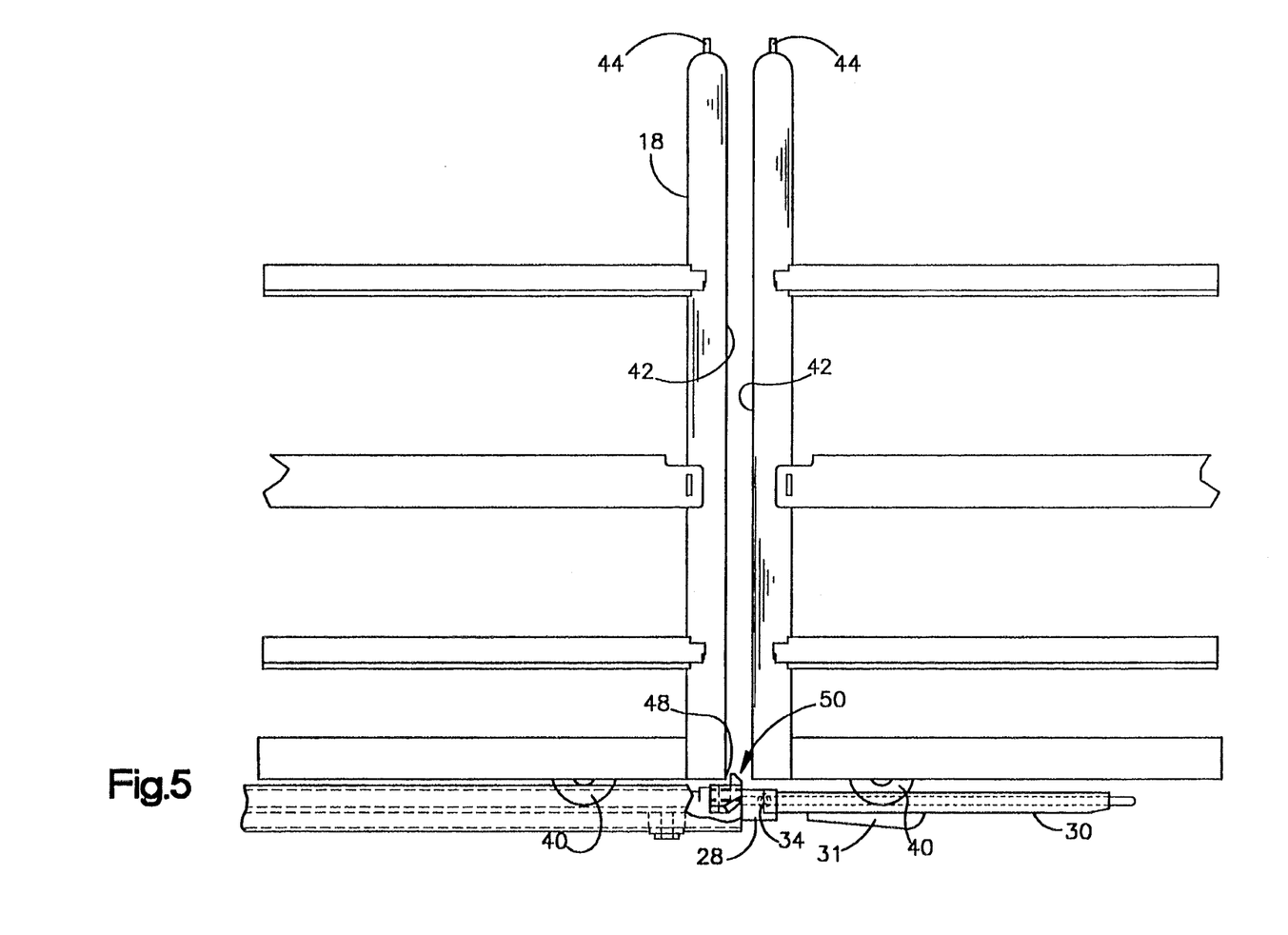
FIG. 5 illustrates a loading car in an inside and an outside position relative to the chamber of FIGS. 1 and 2, including the track lock mechanism.
Figure 6:
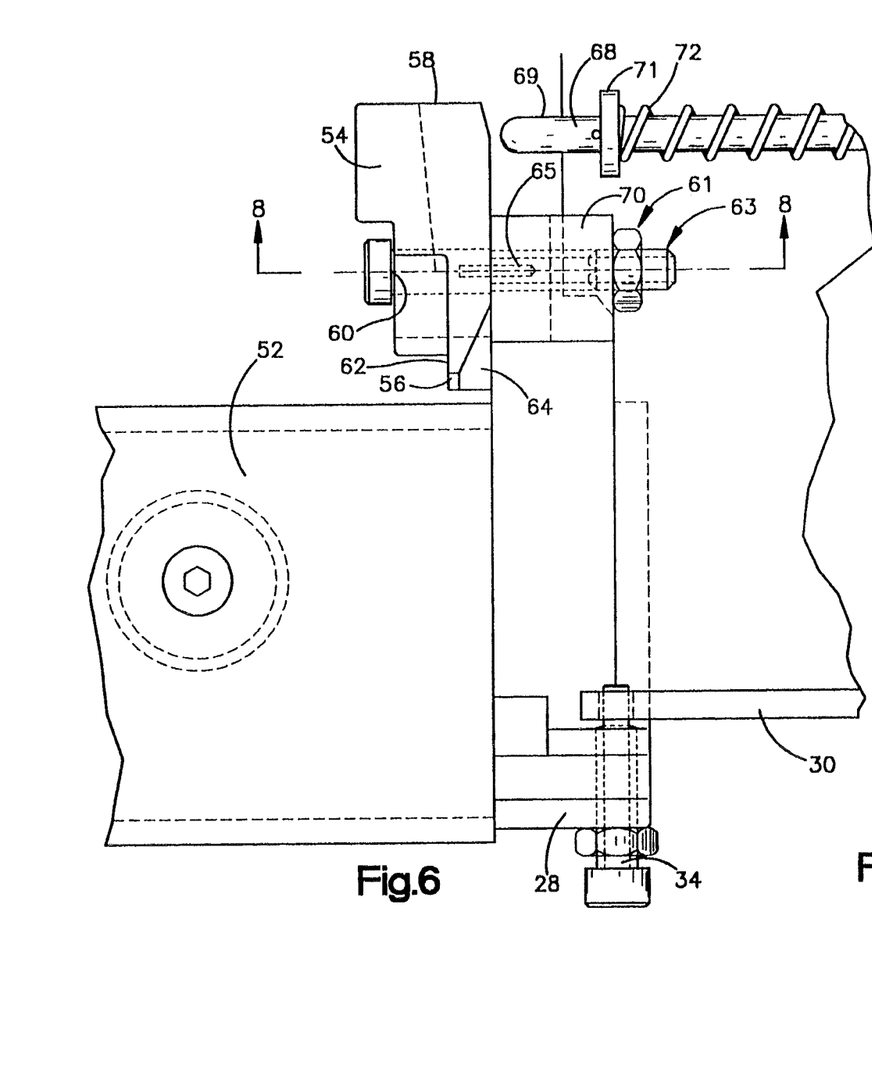
FIG. 6 is an enlarged top view of the track lock mechanism.
Figure 7:
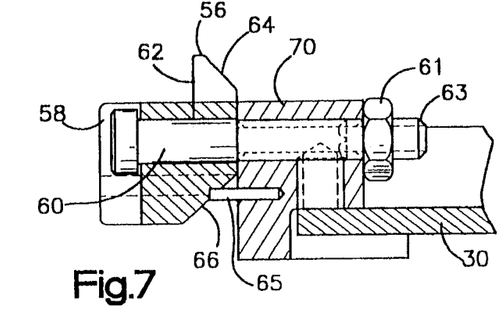
FIG. 7 is a side section view of the track lock through the line VII—VII of FIG. 2.

The stop portion 56 has a flat face 62 against which the complementary flat face of squared edge 48 of the loading car 18 will stop, as shown in FIG. 5, to prevent the car 18 from rolling out of chamber 14. Stop portion 56 also includes an inclined face 64. The flat face 62 faces the interior of the chamber and the inclined face 64 faces the adjacent chamber opening. When a car 18 is pushed into the chamber 14, the leading edge 48 of the front end 42 slides along the inclined face 64 of stop portion 56 of blocking member 54 forcing stop portion 56 to pivot downwardly in a counter clockwise direction about pivot pin 60. Car 18 is thereby able to be rolled into the chamber 14 without manipulation of the track lock mechanism by the operator. Car 18 passes the blocking member 54 as it moves in, holding stop portion 56 down as it progresses until car 18 is entirely within the chamber 14. After car 18 passes blocking member 54, the weighted portion 58 falls by gravity and causes blocking member 54 to pivot in the opposite direction, permitting stop portion 56 to move upwardly again so that the flat face 62 is poised to abut the complementary flat face of squared edge 48, thereby prohibiting the travel of the car 18 out of chamber 14.

A roll pin 65 provides a stop to prevent weighted portion 58 from pivoting too far in the clockwise direction and thus keeps stop portion 56 in the preferred elevated or blocking position.

To unlock the loading car 18 and permit it to travel out of the chamber 14, an actuation member in the form of ramp push rod 68 is moved into operative contact with the weighted portion 58 of the blocking member 54. In embodiments not having a ramp or bridge between the movable carrier and the stationary surface of the compartment, the actuation member can be mounted to the movable carrier or to the stationary surface. In the preferred embodiment wherein a ramp or bridge is used, the actuation member is preferably mounted on the ramp or the bridge.

Weighted portion 58 of the blocking member 54 includes an undercut inclined face 66 which is configured to interact with one end of the push rod 68. Push rod 68 has two opposing rounded ends 67, 69 and a spring 72 near end 69. Spring 72 biases ramp push rod 68 away from the inclined face 66 of weighted portion 58 and out of operative contact with blocking member 54. Push rod 68 is held in alignment on ramp 30 by guide brackets 71. Push rod 68 can slide back and forth in the direction of its longitudinal axis through guide brackets 71.

Figure 16:
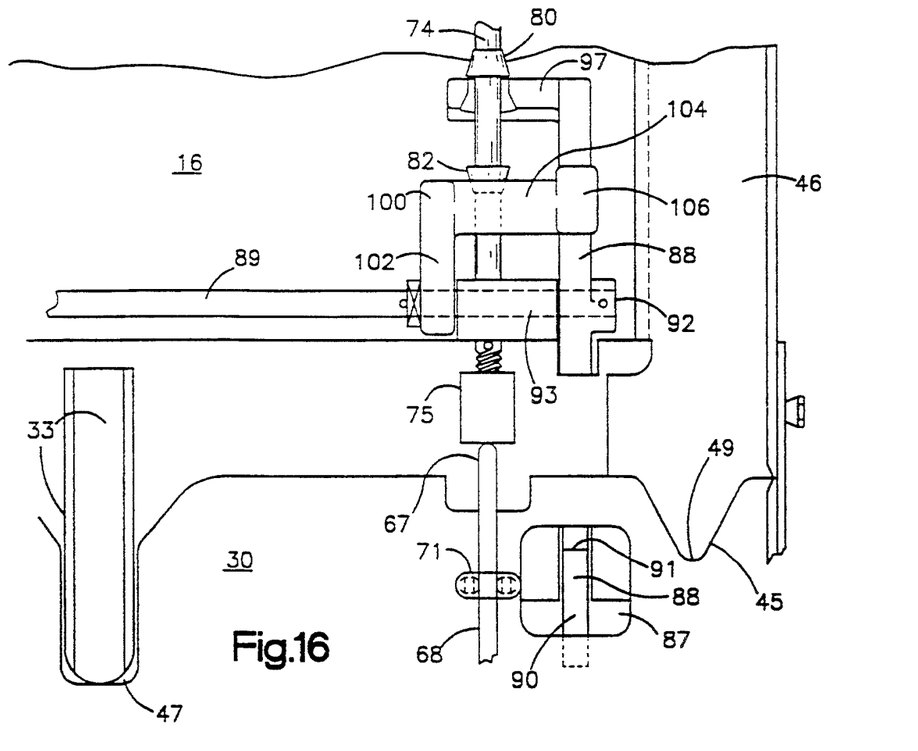
FIG. 16 is a top view of the fail safe mechanism in the unlocked position.

The track lock mechanism can be remotely unlocked by the release mechanism which cooperates with the actuation member to move the blocking member 54. The actuation member and the release mechanism may be integrally connected, e.g. may form a unitary device or, as in the preferred embodiment described herein, may be two distinct devices. FIG. 4 illustrates a carriage push rod 74 having a knob 76 and a spring 78 at the remote end of the transfer carriage 16 near handle 38. At the opposite end of the carriage push rod 74, as shown in FIGS. 16 and 17, is a blunt faced adjustable rod tip 75 which is threaded onto the end of carriage push rod 74. Conical stop members 80, 82 are fixed along the length of push rod 74. Each conical stop member has a flat surface and an inclined surface, as shown in the Figures.

Latch hook members 88, 108 are used to secure the transfer carriage 16 to ramp 30. Each of the two latch hook members 88, 108 are pivotally mounted on cross rod 89 on the sides of the transfer carriage 16. A pivot pin 92 holds the latch hook members 88, 108 to the cross rod 89. Each latch hook member 88, 108 includes a generally horizontally disposed arm 94. Latch hook member 108 is shaped generally like a pistol and also includes a generally vertically disposed leg 96 extending from the arm 94. Cross rod 89 and thus, the pivot point of the members 88, 108 is positioned at about the mid length of the arm 94 dividing arm 94 into forward and rearward sections. The leg 96 extends downwardly from the rearward section of the arm 94 on latch hook member 108. One latch hook member 88, 108 is positioned on each side of the transfer carriage 16 as shown in FIG. 4. The cross rod 89 interconnects the opposing latch hook members 88, 108. At the forward, leading section of each arm 94 is a hook portion 90 which is configured to engage the complementary notches 87 of the ramp 30 to secure the position of the transfer carriage 16 relative to the floor of chamber 14. Each hook portion 90 has a generally smooth outer contour and a blunt inner contour including flat inside edge 91. On the latch hook member 88, there is a bracket 97 at the rearward, trailing section of the arm 94. The lateral bracket 97 has a recess in which push rod 74 can sit when the bracket is elevated by pivotal movement of the rearward section of arm 94. Bracket 97 may be integrally attached to the latch hook member 88 or it may be a separate piece fixed thereto.

A latch release bar 100 is also provided. It is preferably a generally L-shaped member having a leg 104 and an arm 102 pivotally mounted on cross rod 89 at one end of a block 93. The leg 104 extends at a right angle from the arm 102, passes over push rod 74 and rests at end 106 on the arm 94 of the latch hook member 88 to the rear of the cross rod 89. Latch hook release rod 84 is directly joined to the leg 96 of latch hook member 108 and indirectly joined to the other latch hook member 88 through cross rod 89. By pulling latch release rod 84, the leg 96 is pulled rearward toward the rear end of the transfer carriage 16. The rearward movement is translated through cross rod 89 to latch hook member 88 causing both latch hook members 88, 108 to pivot in unison.

In operation, when a loading car 18 is to be loaded into the chamber 14, the door 22 of the chamber is lowered (22a) to expose the chamber opening and to lower ramp 30 to the fully lowered position (30a). A ramp slide 31 on the underside of ramp 30 mates with a ramped shaped door cover for proper contact and door movement. Through the free floating pivot arrangement of the ramp 30 as described in the previously referenced co-pending U.S. patent application of Susan M. Napierkowski and Arthur T. Nagare for Sterilizing Loading Car Transfer Apparatus, the weight of the loading car 18 as it rolls over the ramp 30 is transferred to the chamber tracks and is not borne by the relatively small pivot pin 33.

Figures 10, 11:
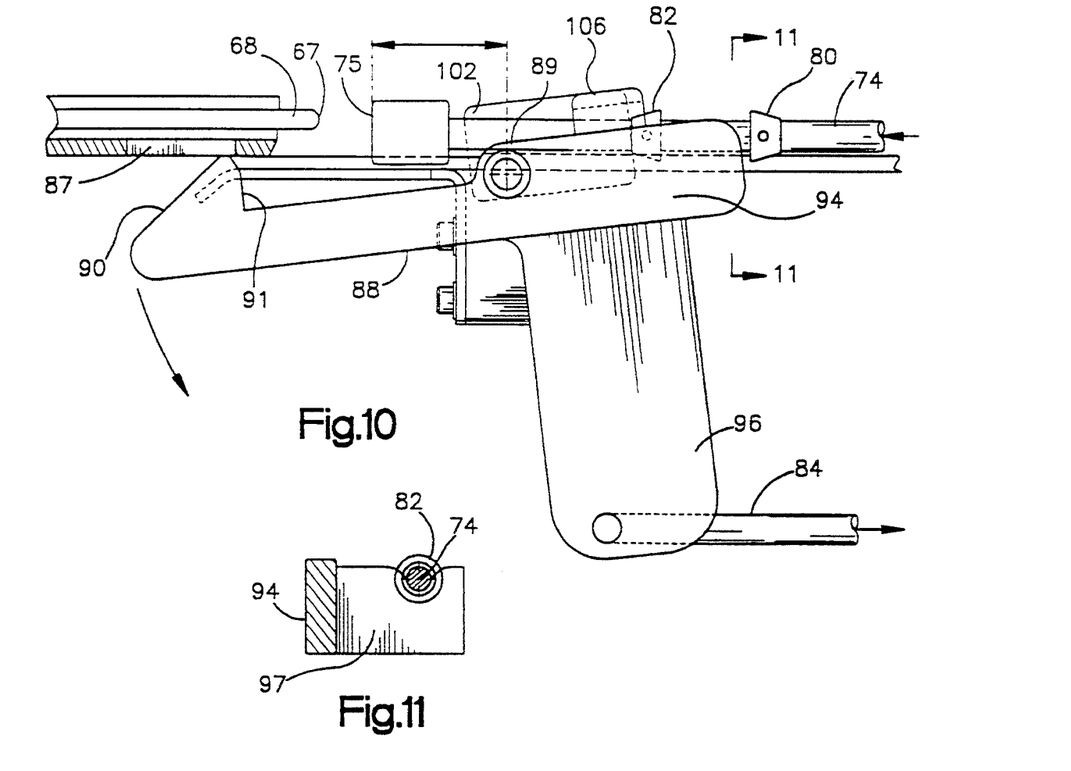
FIG. 10 is a side view of the carriage latch hook in an unlocked position and the fail safe mechanism for preventing release of the track lock.
FIG. 11 is a section view showing a portion of the fail safe mechanism through line XI—XI of FIG. 10.
Figure 12:
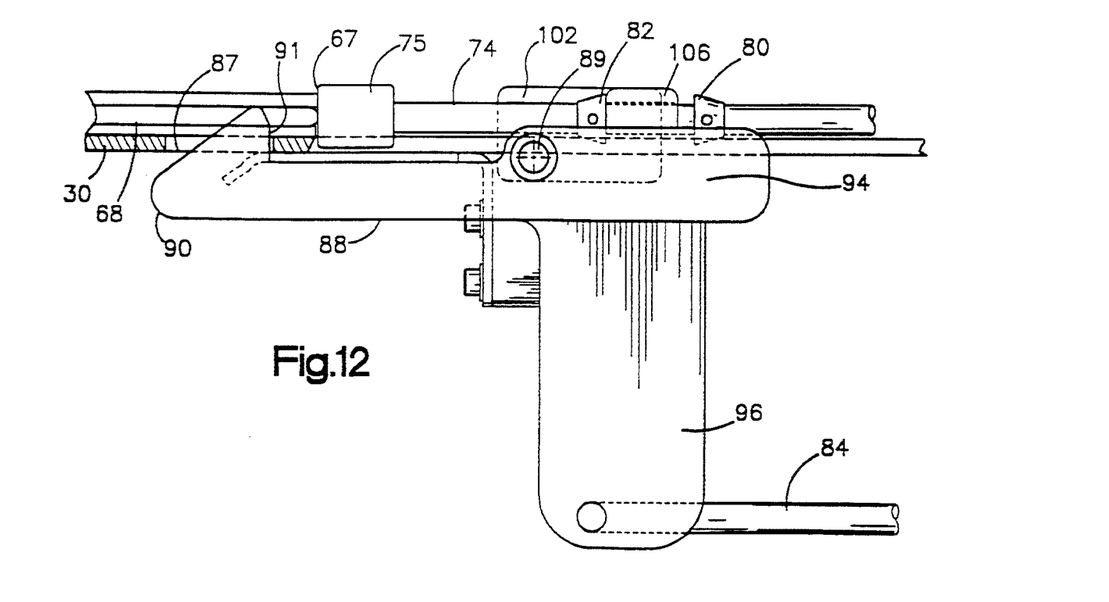
FIG. 12 is a side view of the carriage latch hook of FIG. 11 and the carriage push rod in a locked position.

The transfer carriage 16 with the loading car 18 mounted on it is pushed toward the ramp 30. Sights 44 and the marker can be used to align the loading car 18 with the opening 24. As the transfer carriage 16 is pushed toward the ramp 30, the edge of the ramp 30 slides up the inclined end of hook portions 90 of the latch hook members 88, 108 until the hook portions 90 reach notches 87 in the ramp 30, as shown in FIG. 10. Then the ramp falls allowing the hook portions 90 to engage the notches 87, as shown in FIG. 12. The flat inside edges 91 of the hook portions 90 abut the edge of notches 87 to prevent the transfer carriage 16 from being pulled back away from ramp 30 so that the transfer carriage 16 is securely positioned relative to the chamber 14. Alignment bar 33 slides into guide slot 47 of ramp 30 and the V-shaped ends 49 of tracks 46 align with the complementary V-shaped recesses 45 in ramp 30 to ensure alignment of the tracks 46 on transfer carriage 16 with the ramp 30 and tracks 52 in the chamber 14.

When the latch hook members 88, 108 are securely engaged in notches 87, as shown in FIG. 12, the bias of spring 78 pulls carriage push rod 74 toward the rear of the transfer carriage 16 and maintains the push rod 74 in the position shown in FIG. 16.

The loading car 18 can roll into the chamber along tracks 46 and 52. When the leading edge 48 of end 42 of the loading car 18 reaches blocking member 54 of the track lock mechanism, the edge of the car 18 slides along inclined surface 64 of stop portion 56, forcing the stop portion 56 to pivot in a counterclockwise direction about shoulder bolt 60 to permit the loading car 18 to roll over the blocking member 54. When the loading car 18 is fully in the chamber 14, past the blocking member 54, the weight of the weighted portion 58 causes the stop portion 56 to pivot in a clockwise direction, back to its normally upwardly extending blocking position. Then the flat face 62 of stop portion 56 faces the flat complementary squared edge 48 of the loading car 18, blocking the car from travel in the direction of the blocking member 54 and thereby, prohibiting the loading car 18 from leaving the chamber 14. In chambers having openings at both ends as shown in FIG. 2, the loading car 18 is prohibited from traveling in either direction because there are blocking members 54 at each end of the chamber.

At this time, the door 22 can be closed (22b), raising the ramp 30 to its fully raised position (30b) and disengaging the latch hook members 88, 108. A washing or sterilization cycle can be run in any suitable known manner. In other applications, other operations can take place or the car can simply be stored or transported in the chamber 14 or other compartment.

To remove the loading car 18 from chamber 14, the door 22 is opened (26a), causing ramp 30 to be lowered (30a). The latch hook members 88, 108 of the transfer carriage 16 again engage the notches 87 of the ramp 30 as described above. When the transfer carriage 16 is properly aligned with ramp 30 by means of the guide bar 33, and the latch hook members 88, 108 engage the notches 87, the carriage push rod 74 is linearly aligned with ramp push rod 68. To release the track lock mechanism, the knob 76 on transfer carriage 16 is pushed in towards the chamber 14 which in turn pushes carriage push rod 74 and rod tip 75 against the rounded tip 67 of ramp push rod 68, as shown in FIG. 17. The rounded tip 69 of ramp push rod 68 contacts the inclined surface 66 of weighted portion 58 of the blocking member 54, forcing blocking member 54 to pivot in a counterclockwise direction about shoulder bolt 60, thereby lowering stop portion 56 and moving the flat face 62 from confronting engagement with the flat facing edge 48 of the loading car 18, as shown in FIG. 8.

When carriage push rod 74 is pushed forward, the conical stop members 80 and 82 move forward with push rod 74 so that conical stop member 80 is moved to the opposite side of bracket member 97 as shown in FIG. 17. When the latch hook members 88, 108 are in engagement with notches 87, the arms 94 of the latch hook members 88, 108 are substantially horizontal, as in FIGS. 12 and 13. The bracket 97 on latch hook member 88 is below and out of contact with push rod 74 in this position so that forward movement of the conical stop member 80 is not hindered by bracket 97. Arm 104 of the latch release bar 100 slides up the inclined surface of conical stop member 82 until it passes it, then drops down to rest in the area between the stops 82 and 80 and catch behind the flat surface of conical stop 82. The flat side of conical stop member 82 prevents the push rod 74 from moving back, out of contact with push rod 68 so that the track lock blocking member 54 will remain in the unlocked position.

Figures 14, 15:
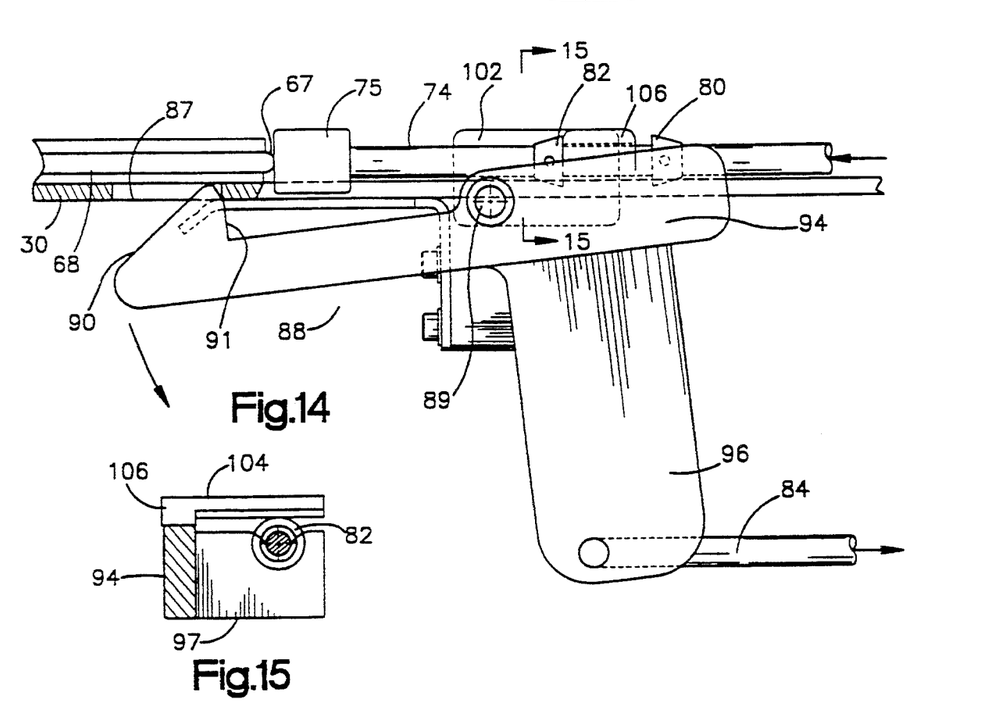
FIG. 14 is a side view of the carriage latch hook showing the operation of the automatic reset feature.
FIG. 15 is a section view of a portion of the fail safe mechanism through line XV—XV of FIG. 14.

The loading car 18 can then safely be pulled out of the chamber 14 onto tracks 46 on transfer carriage 16. Then, the latch hook members 88, 108 can be released from the notches 87 in ramp 30 by pulling knob 86 and latch release rod 84 to tilt leg 96 of latch hook member 108 back, which in turn pivots the arm 94 of latch hook member 108. That pivotal movement is transferred to latch hook member 88 via cross rod 89. Thus, both of the hook portions 90 are pivoted down, out of engagement with notches 87 in ramp 30, as shown in FIG. 14. When the latch hook member 88 is tilted, the rearward section of its arm 94 is lifted upwards causing end 106 of the latch release bar 100 to raise its arm 104 over conical stop member 82, as shown in FIGS. 14 and 15. Spring 78 on push rod 74 pulls push rod 74 back and with it, conical stop member 82 so that the stop member 82 moves to the other side of the latch release bar arm 104. However, the bracket 97 is also raised when the rearward section of arm 94 of latch hook member 88 is tilted up so that bracket 97 is now in contact with push rod 74 and conical stop member 80. The shape of the bracket recess complements the conical shape of the stop member 80 so that the stop member 80 can move rearward through bracket 97, although with some resistance to prevent a rapid snap back. Due to the rearward bias of spring 78, the carriage push rod 74 pulls away from ramp push rod 68 which in turn is pulled away, by the rearward bias of spring 72, from blocking member 54. The blocking member 54 then pivots in the clockwise direction, again raising the stop portion 56 to its blocking position. Thus, the blocking member 54 is automatically reset in the blocking position when the push rods 68, 74 are released.

The mechanism of the present invention provides a fail safe device to prevent unlocking the track lock mechanism if the latch hook members 88, 108 are not securely engaged to the ramp 30. FIG. 10 shows the situation where the hook portions 90 have not engaged the notches 87 of the ramp 30. The latch hook members 88, 108 are tilted upwards so that the bracket 97 on latch hook member 88 is raised to engage carriage push rod 74 behind conical stop member 80. The stop member 80 blocks carriage push rod 74 from being pushed forward to actuate ramp push rod 68 and to pivot blocking member 54 to the unlocked position. If the operator attempts to push carriage push rod 74 forward, the conical stop member 80 is blocked on three sides by the bracket 97. The shape of the recess in the bracket 97, as shown in FIG. 16, effectively blocks the flat face of conical stop member 80. When moving in the opposite direction, however, the shape of the recess permits the conical side of the stop member 80 to slide through with only moderate resistance. Thus, the track lock mechanism cannot be unlocked if the transfer carriage 16 is not secured to the ramp 30, but when secured, the track lock can be released with ease. The subsequent release of the latch hook members 88, 108 causes the latch release bar 100 to release the stop member 82, permitting automatic reset of the push rod 78 and conical stop members 80, 82.

Figure 13:
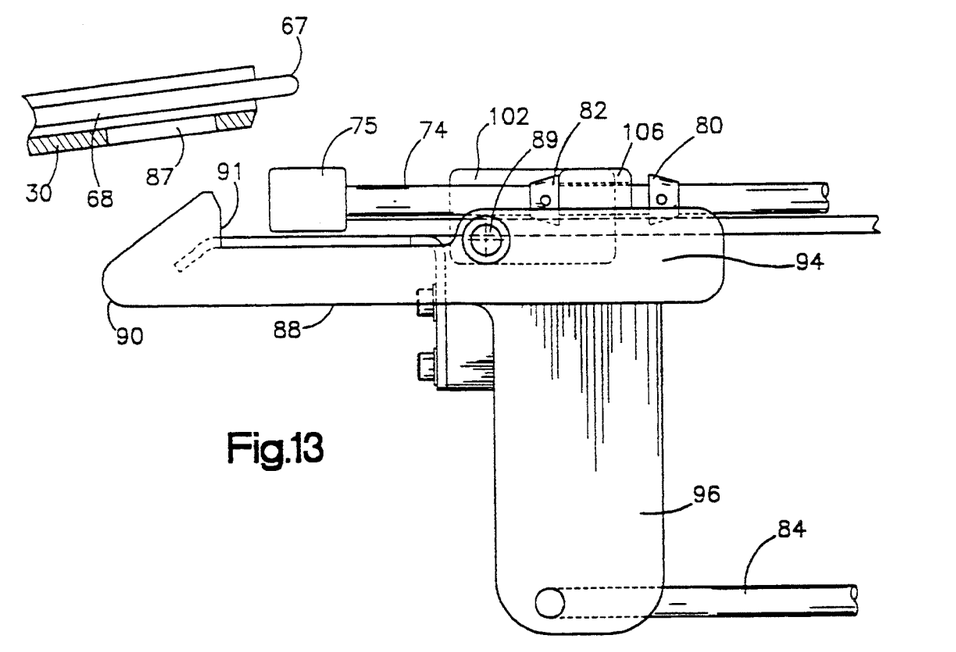
FIG. 13 is a side view of the carriage latch hook of FIG. 11 demonstrating that the door assembly can be moved while the carriage push rod is in a locked position.

If it is necessary to close the door 22 while the transfer carriage 16 is in engagement with ramp 30, the door 22 can be closed without releasing the latch hook members 88, 108. The tip 67 of ramp push rod 68 is rounded to permit it to smoothly slide along the surface of rod tip 75, as shown in FIG. 13. When the ramp 30 is raised, push rod 68 automatically pulls away from blocking member 54 due to the action of spring 72. The stop portion 56 is automatically raised to the blocking position. The beveled edge of the inside of hook portion 90 above flat inner face 91 permits the notches 87 to smoothly lift off of hook portion 90 without damage to the ramp 30 or the transfer carriage 16.

To accommodate differences in tolerances in the ramps 30 of different chambers and a variety of different transfer carriages 16, the notches 87 are somewhat larger than the hook portions 90 creating a small gap. The rod tip 75 is threaded onto push rod 74 to permit linear adjustment to make sure that proper contact between the rod tip 75 and the tip 67 of ramp push rod 68 and adequate clearance for movement of the ramp 30 occurs, notwithstanding the permissible gap in the engagement of the hook portions 90 to notches 87. The V-shaped ends 49 on tracks 46 and the complementary recesses 45 on ramp 30 also permit some deviation in the dimensions of the complementary surfaces in a variety of different components intended to function together.

Finally, although the track lock mechanism has been described as being weighted to automatically assume the blocking position and the track lock release mechanism has been described for use in moving the track lock from the blocking position to a position which permits travel of the loading car 18, one skilled in the art can see that the broad application of the mechanism of the present invention can be easily reversed by altering the shape of blocking member 54 to have the track lock weighted or otherwise biased to automatically assume a position which permits travel. Actuation Of the push rods 68 and 74 would then move the track lock to the blocking position. In the preferred application, however, for safety precautions, the track lock should be weighted to automatically assume the blocking position.

What we claim is:

1. Apparatus for remotely permitting or prohibiting travel of a movable device such as a loading car comprising:
    at least one track for guiding the movable device;
    a blocking member mounted adjacent to said track for movement about an axis parallel to a longitudinal axis of the track between a first position for blocking a path of travel of the movable device along said track and a second position clear of said path of travel of the movable device;
    an actuating member having a longitudinal axis with a first end proximate said blocking member and a second end remotely situated from said blocking member;
    means for biasing said actuating member away from operative contact with said blocking member; and,
    means remotely situated from said blocking member for cooperating with said second end of said actuating member for moving said first end of said actuating member along its longitudinal axis into operative contact with said blocking member to effectuate movement of said blocking member from one of said first or second positions to the other of said first or second positions.

2. The apparatus recited in claim 1 further comprising means for locking said actuating member into operative contact with said blocking member to maintain said blocking member in a desired one of said first or second positions.

3. The apparatus recited in claim 2 further comprising means for releasing said locking means to permit said actuating member to move out of operative contact with said blocking member.

4. The apparatus recited in claim 1 wherein said blocking member is pivotally mounted at a pivot point on a surface adjacent said path of travel of said movable device and includes a first portion on one side of said pivot point and a second portion on the other side of said pivot point, said first portion being configured for blocking contact with said movable device and said second portion being configured for operative contact with said first end of said actuating member.

5. The apparatus recited in claim 4 wherein said blocking member is balanced about said pivot point such that said blocking member is gravitationally urged to said first position unless said actuating member is in operative contact with said second portion of said blocking member.

6. The apparatus recited in claim 4 wherein said first portion of said blocking member comprises:
    a first face on one side of said first portion configured for blocking a surface of said movable device to prohibit travel of said movable device in a first direction when said movable device is on said path; and
    a second face on another side of said first portion, opposite said first face, configured for nonblocking association with said movable device to permit travel thereof in a second direction opposite said first direction when said movable device is on said path.

7. The apparatus recited in claim 4 wherein said second portion of said blocking member has a mass sufficient to cause said blocking member is gravitationally urged to pivot such that said first portion is elevated relative to said second portion to place said first portion in said first position and wherein said second portion has an inclined surface for sliding contact with said first end of said actuating member.

8. The apparatus recited in claim 1 wherein said actuating member is a first rod having opposing rounded ends and said biasing means is a spring and a spring retainer surrounding a portion of said first rod adjacent said first end.

9. The apparatus recited in claim 8 wherein said cooperating means comprises a second rod having a longitudinal axis and being slidably mounted for movement in the direction of said longitudinal axis, said second rod having a blunt surface at one end thereof for contact with said second end of said first rod when said second rod is moved into linear alignment with said first rod and moved into contact with said second end of said first rod.

10. The apparatus recited in claim 1 wherein said cooperating means is mounted on a first surface and said blocking member is mounted on a second surface, and said apparatus further comprises means for securing said first surface into position relative to said second surface.

11. The apparatus recited in claim 10 wherein said first surface is a movable carrier and said second surface is a stationary surface.

12. The apparatus recited in claim 10 further comprising:
- means for preventing said cooperating means from cooperating with said actuating means unless said first surface is secured to said second surface;
- means for maintaining said actuating member in operative contact with said blocking member to lock said blocking member in one of said first or second positions; and,
- means for releasing said securing means.

13. The apparatus recited in claim 12 wherein said securing means has a rearward section and a forward section for releasable engagement with a complementary engaging section on said second surface and said securing means is pivotally mounted on said first surface at a pivotal center intermediate said rearward section and said forward section.

14. The apparatus recited in claim 13 wherein said preventing means is a bracket proximate a path of movement of said cooperating means and which is movable with said rearward section of said securing means for blocking forward movement of said cooperating means along said path of movement when said forward section of said securing means is not in engagement with said complementary section of said second surface.

15. The apparatus recited in claim 14 wherein said maintaining means is a bar which is movable with said rearward section of said securing means for blocking rearward movement of said cooperating means along said path of movement when said actuating member is in operative contact with said blocking member.

16. The apparatus recited in claim 15 wherein said cooperating means is a rod having at least one stop member mounted thereon for contact with said bar and said bracket such that said at least one stop member abuts said bar when said actuating member is in operative contact with said blocking member and abuts said bracket when said forward section of said securing means is not in engagement with said complementary section of said second surface.

17. The apparatus recited in claim 14 wherein said bracket is integrally connected to said rearward section.

18. The apparatus recited in claim 13 wherein said means for releasing said securing means is operatively connected to said securing means such that actuation of said releasing means causes said forward section to pivot out of engagement with said complementary engaging section on said second surface.

19. The apparatus recited in claim 18 wherein there are two complementary engaging sections on said second surface spaced from each other a distance d and two securing means spaced from each other said distance d, each said engaging sections being positioned to receive an operative part on said forward section of a different one of said two securing means;
- said operative part comprising a generally hook shaped member having a smooth outer contour and a blunt inner contour for engaging contact with the corresponding one of said two engaging sections in which said operative part is received; and
- one said securing means having a leg section extending from said rearward section and being pivotally connected to said means for releasing said securing means.

20. The apparatus recited in claim 19 wherein said means for releasing said securing means is an elongate rod member disposed on said first surface and pivotally mounted at one end to said leg section of said one securing means and having another end remotely situated from said blocking member for exerting a force in a lineal direction to effectuate movement of said leg section.

21. The apparatus recited in claim 1 wherein said actuating member and said cooperating means are integrally attached to each other.

22. The apparatus recited in claim 1 wherein said actuating member and said cooperating means are unattached to each other.

* * * * *

UNITED STATES PATENT AND TRADEMARK OFFICE
CERTIFICATE OF CORRECTION

PATENT NO. : 5,431,521
DATED : July 11, 1995
INVENTOR(S) : Napierkowski, et al

It is certified that error appears in the above-indentified patent and that said Letters Patent is hereby corrected as shown below:

On title page, under item [56]
Other Publications

AMSCO-Eagle Ito Gas Sterilization System,
    Feb. 1983, pp. 1, 11

Should read:

AMSCO-Eagle Eto Gas Sterilization System,
    Feb. 1983, pp. 1, 11

Signed and Sealed this

Nineteenth Day of September, 1995

Attest:

BRUCE LEHMAN

Attesting Officer    Commissioner of Patents and Trademarks